Jan. 3, 1967     J. W. FLECK     3,296,058

UNITARY COMPOSITE TRUNK CHRISTMAS TREE

Filed Nov. 14, 1963

INVENTOR.
JACK W. FLECK

BY
*Robert W. Beach*

ATTORNEY

United States Patent Office 3,296,058
Patented Jan. 3, 1967

3,296,058
UNITARY COMPOSITE TRUNK CHRISTMAS TREE
Jack W. Fleck, 4536 Lake Heights,
Bellevue, Wash. 98004
Filed Nov. 14, 1963, Ser. No. 323,714
3 Claims. (Cl. 161—22)

This invention relates to a unitary Christmas tree having twin trunks artificially united.

The business of providing Christmas trees for the United States, although seasonal, has developed into a very large commercial venture. In country communities it may still be possible for each family to cut its Christmas tree from natural growth in the woods, but as the country has become more urbanized it is not only uneconomical but impractical for city dwellers to cut their own Christmas trees in most instances. In its early stages the commercial business in Christmas trees relied principally on cutting young trees in natural woods, but as the business has expanded it has become profitable to grow Christmas trees as a crop on tree farms.

The demand for Christmas trees continues to increase at a rate faster than good supplies can be developed. Both in the woods and in Christmas tree farms it has been found that because of a scarcity of light or other nonuniform growing conditions many trees do not grow symmetrically. Symmetrical bushy trees therefore command premium prices and asymmetrical or lopsided trees which a few years ago would have been unmarketable are now considered to be merchantable at lower prices. There are still many trees of Christmas tree size grown in the woods and on tree farms, however, which are so lopsided that it has not been profitable to market them.

It is the principal object of the present invention to convert Christmas trees so lopsided as to be culls into marketable Christmas trees of high quality.

A further object is to make such conversion of cull Christmas trees into high grade merchantable Christmas trees quickly and economically.

More specifically, it is an object to unite the trunks of a plurality of very lopsided Christmas trees in a relationship such that the resultant composite trunk tree is generally symmetrical and bushy, so as to constitute a high grade tree.

In accomplishing the foregoing objects the trunks of a plurality of very lopsided Christmas trees such as two trees, are placed in side-by-side generally coextensive relationship and the trunks of the two trees are then united by joining them together, either by a pin-type joint or by bonding them together, or by a combination of these two techniques. The resultant unitary twin trunk tree will be sufficiently symmetrical so as to be considered to be high grade.

Figure 3:
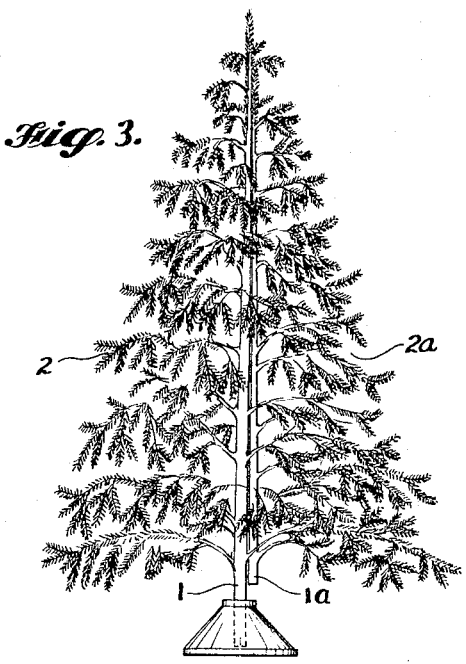
FIGURE 3 is a side elevation of the two lopsided Christmas trees shown in FIGURES 1 and 2 having their trunks united to form a unitary Christmas tree.

FIGURES 4 to 7, inclusive, are horizontal transverse sections through the twin trunk of a unitary Christmas tree, such as shown in FIGURE 3, illustrating different types of trunk joining structure.

The representative Christmas trees 1 and 1a with lopsided foliage growth, which are quite suitable for utilization in connection with this invention, have heavy bushy foliage on their sides 2 and 2a, respectively. The foliage 3 and 3a on the opposite sides of these trees is, on the contrary, very sparse. Consequently, the trees 1 and 1a are so lopsided that such trees have in the past been considered to be culls and would have been discarded. Trees for the purpose of this invention are selected from such cull trees with reasonable care.

In order to construct a Christmas tree according to the present invention it is necessary that the plurality of lopsided Christmas trees, such as 1 and 1a, selected to be united, be of the same species, be of at least nearly the same height, and have sides 2 and 2a which have reasonably full and bushy foliage and preferably which are of approximately the same shape. In addition, the trunks 1 and 1a should be reasonably straight so that when they are placed in side-by-side relationship they will be generally contiguous. The fullness of the tree sides 3 and 3a is of quite secondary significance, although if the sides 2 and 2a are sufficiently bushy and similar it might be desirable to lop from the foliage sides 3 and 3a any exceptionally long straggly branches. The small branches and twigs forming the foliage 3 and 3a need not be removed for such branches simply provide desirable filling for the central portion of the completed tree formed by uniting the trunks of the trees 1 and 1a.

Figure 4:
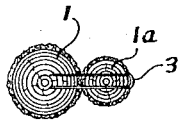
Figure 5:

To manufacture a twin trunk Christmas tree in accordance with the present invention the trunks of the two trees 1 and 1a are artificially united after being placed in adjacent side-by-side relationship. The two trunks can practically be united by suitable joining means which can be either of the pin type or of the binding type. In FIGURES 4 and 5 representative types of trunk pinning means are illustrated. The use of pinning means is most successful for Christmas trees having trunks of medium soft wood especially. Tree trunks having wood of such type can be united by pin means driven into or through the wood, such, for example, as the unclinched or drift stable 3 as shown in FIGURE 4. A nail or drift bolt might be substituted for such drift staple, but in any of these cases the wood must be sufficiently soft so that the drift member can be driven reasonably easily, yet the friction of the wood on the drift member will be sufficient to hold such drift member firmly in place.

If the wood were too soft a drift member such as the drift staple 3 shown in FIGURE 4 might not hold sufficiently reliably. For such softer wood a through pin member could be used, such as the large rivet 4 shown in FIGURE 5. Alternatively, a through bolt or a clinched staple could be used for this purpose. A similar type of pin joint can be employed if the wood of the tree trunks is sufficiently hard so that a drift member cannot be driven into it easily. It would then be necessary to drill aligned holes through the trunks in side-by-side relationship for the purpose of receiving the shank of a rivet or through bolt, or if two holes are bored in generally side-by-side relationship the two legs of a long staple could be extended through them and clinched. Other types of pin joints which might be used in connection with such bored holes could be a large cotter key type of member or a short wire which could be extended through the holes and then the ends of the wire twisted together at one side or the other of the twin trunks.

Figure 6:
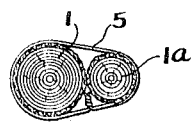
Figure 7:
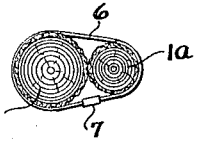

Another type of joining means which can be used, however hard or soft the trunks of the trees may be, is binding means. Such binding means can encircle both trunks 1 and 1a and draw them together. In FIGURE 6 binding means 5 is illustrated which consists of one or more turns of wire around both trunks of the trees which is then tightened and secured to lash the tree trunks together. The alternative binding means shown in FIGURE 7 is a metal band or strap 6 commonly used for packaging purposes, which can be tensioned by a suitable tool and the ends of the band then secured together by a clamp 7. Clamp means which would simply draw the tree trunks together and hold then firmly in side-by-side relationship would also constitute binding means.

Whatever type of joining means is used to unite the trunks 1 and 1a of the two Christmas trees with lopsided foliage growth it will, of course, be necessary to secure the trunks at more than one location. The trunks could, for example, be lashed together by a wire wound spirally around the two trunks over a substantial distance lengthwise of them, or a plurality of joining means arranged along the length of the Christmas tree could be used. Thus, if a drift bolt or the drift staple of FIGURE 3 were used it would be necessary to employ a plurality and preferably several of such elements spaced lengthwise of the tree trunks. It would also be necessary to use a plurality of uniting elements if a through bolt or rivet, such as 4 in FIGURE 5, or a wire binding such as 5 in FIGURE 6, or a binding band such as 6 in FIGURE 7, were used.

It would be desirable to use several uniting elements spaced along the tree trunks, three or four being preferred. It is not necessary that all of the joining members be of the same type in any given composite trunk tree structure. Thus, at one location it might be satisfactory to use a drift staple 3, as shown in FIGURE 4, and at another location a through bolt or rivet such as 4 in FIGURE 5 could be used. Also, there would be no disadvantage as far as the product is concerned in utilizing at one or more locations a binding element such as the wire loop 5 of FIGURE 6 or the metal band 6 of FIGURE 7. The controlling feature in making a decision as to what type of joining means to use is the expense of the item, the amount of labor required to complete the uniting of the tree trunks using such means and finally, the durability of such means after it has been placed, so that despite any rough handling which the composite tree might receive the means joining the tree trunks will remain intact.

When the trunks 1 and 1a of the two lopsided Christmas trees have been artificially united in the manner described above, it may be desirable to shorten the butt of the trunk of one of the Christmas trees, such as 1a, so as to leave only a single trunk to be inserted into and secured in a Christmas tree stand, a representative type of which is illustrated in FIGURE 3. It is not necessary to cut off short one of the tree trunks in this manner, but in some instances it may be preferred. The unitary composite trunk Christmas tree when thus completed can be handled and sold just like any other Christmas tree, but it is preferred that it be enveloped in a wrapper or placed in a box as other high grade trees frequently are.

Figure 1:
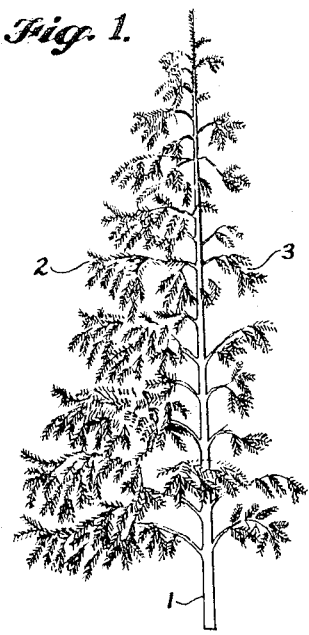
FIGURE 1 is an elevation of a representative Christmas tree with lopsided foliage growth and FIGURE 2 is a side elevation of a second representative Christmas tree with lopsided foliage growth.
Figure 2:
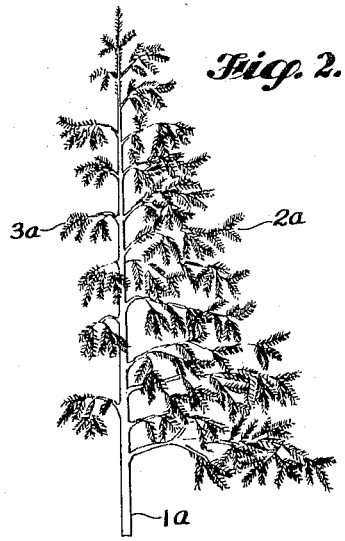

It will be appreciated that by the use of the technique described above the manufacture of unitary Christmas trees having artificially united tree trunks can be applied to Christmas trees of any size. While it is true that only half as many unitary trees can be manufactured for sale by this technique as were grown for use in manufacture of such unitary trees, the advantage is that if lopsided trees such as shown in FIGURES 1 and 2, which were grown and harvested, were not used for this purpose they would simply be discarded or the better ones would be sold at a sacrifice price. It is far better to sell a single high grade Christmas tree at a good price than to try to sell more trees with lopsided foliage at a poor price, or even to discard such trees as worthless culls. Use of the present invention, therefore, is considered to be an important step in salvaging economically waste products of the Christmas tree supplying business and to increase the supply of merchantable Christmas trees.

I claim:

1. A unitary Christmas tree, comprising a plurality of naturally-grown trees, each with lopsided foliage growth, having their trunks disposed in such substantially parallel coextensive juxtaposed relationship as to form a tree with a composite trunk and with generally symmetrical foliage growth around the composite trunk, and means uniting said trunks fixed in such relationship and with the lower portion of one of said trunks projecting sufficiently beyond the butts of all the other trunks of said composite trunk to enable said projecting trunk portion to be mounted in a tree stand.

2. The unitary Christmas tree defined in claim 1, in which the uniting means include binding means lashing the tree trunks together.

3. The unitary Christmas tree defined in claim 1, in which the uniting means include a plurality of pin-type joining elements spaced lengthwise of the tree trunks and penetrating adjacent trunks.

References Cited by the Examiner

UNITED STATES PATENTS

| 206,387 | 7/1878 | Bowen | 161—23 |
| 2,565,700 | 8/1951 | Schiller | 161—23 |

FOREIGN PATENTS 25,105   12/1901   Switzerland.

ALEXANDER WYMAN, *Primary Examiner.*

JACOB STEINBERG, *Examiner.*